United States Patent [19]

Erickson et al.

[11] Patent Number: 5,312,580
[45] Date of Patent: May 17, 1994

[54] METHODS OF MANUFACTURING POROUS METAL ALLOY FUEL CELL COMPONENTS

[76] Inventors: Diane S. Erickson, 3931 W. 64th Pl., Chicago, Ill. 60629; Estela T. Ong, 2931 S. Emerald Ave., Chicago, Ill. 60616

[21] Appl. No.: 881,686

[22] Filed: May 12, 1992

[51] Int. Cl.$^5$ ................................................. B22F 5/00
[52] U.S. Cl. .................................... 419/2; 419/36; 419/46; 419/53; 419/57
[58] Field of Search ................ 75/249, 250, 245, 246, 75/247; 419/2, 10, 36, 45, 46, 53, 58

[56] References Cited

U.S. PATENT DOCUMENTS

| | | | |
|---|---|---|---|
| 3,471,287 | 10/1969 | Roberts, Jr. | 419/2 |
| 3,617,389 | 11/1971 | Kuhn et al. | 502/101 |
| 3,658,597 | 4/1972 | Gray | 419/19 |
| 3,661,648 | 5/1972 | Gerbier et al. | 419/8 |
| 3,681,146 | 8/1972 | Baba et al. | 419/10 |
| 3,711,279 | 1/1973 | Hivert et al. | 419/2 |
| 3,799,808 | 3/1974 | Hancock | 419/2 |
| 3,802,878 | 4/1974 | Lindstrom | 419/2 |
| 4,206,271 | 6/1980 | Norling et al. | 429/45 |
| 4,273,582 | 6/1981 | Gutjahr et al. | 75/222 |
| 4,386,960 | 6/1983 | Iacovangelo et al. | 419/9 |
| 4,444,718 | 4/1984 | Smith et al. | 419/37 |
| 4,507,262 | 3/1985 | Karas et al. | 419/2 |
| 4,569,821 | 2/1986 | Duperray et al. | 419/2 |
| 4,659,379 | 4/1987 | Singh et al. | 75/234 |
| 4,664,883 | 5/1987 | Melody et al. | 419/2 |
| 4,772,449 | 9/1988 | Bones et al. | 419/2 |
| 4,780,437 | 10/1988 | Smith | 502/101 |
| 4,977,036 | 12/1990 | Baldi | 428/553 |
| 4,999,155 | 3/1991 | Ong | 419/2 |
| 5,028,367 | 7/1991 | Wei et al. | 264/63 |
| 5,110,541 | 5/1992 | Yamamasu et al. | 419/2 |

*Primary Examiner*—Donald P. Walsh
*Assistant Examiner*—Ngoclan T. Mai

[57] ABSTRACT

Porous metal components for high temperature fuel cells which are made by integrating the heretofore employed, separate tape casting and pack cementation processes. Particles of a base metal and a master alloy are suspended in a liquid medium in which a binding agent and a halide activator are dispersed. The suspension is cast into the shape wanted in the component, typically by tape casting; and the cast structure is heated to remove the liquid medium, leaving a flexible, green cast structure commonly referred to as a tape. The green tape is so heated as to: (a) burn out the binder in the tape; (b) form an alloy of the base metal and an alloying metal in the master alloy; and (c) sinter the alloy particles into a porous, coherent metal structure.

10 Claims, 1 Drawing Sheet

METHODS OF MANUFACTURING POROUS METAL ALLOY FUEL CELL COMPONENTS

TECHNICAL FIELD OF THE INVENTION

The present invention relates to novel, improved methods of manufacturing porous, metal alloy components such as electrodes and bubble barriers for molten carbonate and other high temperature fuel cells.

BACKGROUND OF THE INVENTION

Fuel cells were invented in 1839 by Sir William Grove. A fuel cell is an electrochemical device which directly combines a fuel and an oxidant such as hydrogen and oxygen to produce electricity and water. It has an anode and a cathode spanned by an electrolyte. Hydrogen is oxidized to hydrated protons on the anode with an accompanying release of electrons to form water, consuming electrons in the process. Electrons flow from the anode to the cathode through an external load, and the circuit is completed by ionic current transport through the electrolyte.

Fuel cells do not pollute the environment. They operate quietly, and high temperature fuel cells have a potential efficiency of ca. 80 percent. Virtually any natural or synthetic fuel from which hydrogen can be extracted—by steam reforming, for example—can be employed.

It is well-known that oxidation-reduction reactions are accompanied by the transfer of electrons from the reductant to the oxidant. In fuel cells, the oxidation reaction and reduction reactions take place at spatially separated electrodes. Each of these reactions is called a half-cell reaction. The anode is the site of the oxidation half-cell reaction. A reactant, referred to as the fuel, that is oxidizable with respect to some oxidant, is supplied to the anode and is there electrochemically oxidized. Oxidation of the fuel releases electrons to the anode.

The cathode is separated from the anode by a tile which is a mixture of electrolyte and an inert material which remains solid at the fuel cell operating temperature. The other half-cell reaction simultaneously takes place at the cathode. The oxidant, which is reducible with respect to the fuel, is supplied to the cathode and is there electrochemically reduced. This reaction takes up electrons from the cathode.

These two half-cell reactions result in the cathode having a deficiency of electrons and the anode an excess of electrons. Therefore, a current will flow in an external circuit connected between the anode and the cathode as long as fuel and oxidant are available at the anode and cathode and waste (or reaction) products are removed from the reaction sites.

Modern, state-of-the-art fuel cells typically employ molten carbonate electrolytes and operate at temperatures in the range of 500°–750° C. Such cells have an operating efficiency in the 40 to 80 percent range.

Molten carbonate (MCFC) fuel cells require porous electrodes which have a uniform microstructure and will remain stable over long periods of time (typically required to be at least 40,00–50,000 hours) at the high temperatures and in the corrosive environments in which they operate.

Also, MCFC and other fuel cells commonly have a porous, electrode compatible, metallic bubble barrier on the face of the fuel cell anode or cathode or both of these electrodes. If the electrolyte filled tile does not pose an adequate barrier to the fuel and oxidant or the tile cracks, the fuel and oxidant may mix. At a minimum, this may result in a voltage drop and/or a loss of fuel. In more severe cases, there may be service life shortening oxidation of the anode and/or the creation of a potential safety hazard. In fuel cells equipped with bubble barriers, the pores of those components fill up with the electrolyte and prevent mixing of the fuel and oxidant in circumstances less catastrophic than those which result in a blowout of the electrolyte. Bubble barriers are required to remain stable and serviceable for the same periods of time under the same operating conditions as the electrodes with which they are associated in a MCFC or other high temperature fuel cell.

The porous metal MCFC components discussed above—cathodes, anodes, and bubble barriers—are currently fabricated from very fine base metal powders such as the 2–3 micron carbonyl nickels. Alloying metals such as Cu, Al, Ti, etc. are commonly added to the base metal to improve critical properties of the component being fabricated. For example: a nickel anode alloyed with one of these metals can be internally oxidized to form a dispersion of the alloy metal oxide in the nickel matrix. This produces a creep resistant anode.

Fine alloy powders are generally costly to produce, and they are often not readily available in the marketplace.

Furthermore, alloyed metal components for high temperature fuel cells such as the state-of-the-art Ni-Cr anodes are made by either tape casting or by loose sintering a physical mixture of metal powders and heat treating the resulting shape at elevated temperatures to diffuse the alloying metal throughout the base metal. To obtain a uniform dispersion of the second phase requires prolonged time at temperature. This may result in an unacceptable decrease in the porosity of the metal component.

The use of pack cementation to fabricate components for high temperature fuel cells has also been proposed. In this process, a porous component fabricated from the selected base metal is imbedded in a cementation pack consisting of an activator salt, a master alloy containing the alloying metal to be added, and an inert filler. The electrode is prevented from sintering to, or being contaminated by, the pack via a costly, inert $ZrO_2$ or $Al_2O_3$ loaded, porous paper. The electrode and pack are placed in a container having a reducing environment and raised to elevated temperatures at which the master alloy, such as Ni-3Al, reacts with the activator salt, such as NaCl, forming metal halide vapors such as aluminum chlorides. The metal halide vapors deposit on the base metal surface, and inward diffusion of the alloying metal results in alloy formation with the base. This is an expensive, batch-type process which adds considerably to the cost of making the electrode or other fuel cell component. And, as yet, a simple method of ensuring the even distribution of the pack materials required for needed homogeneity in the component being fabricated has not been discovered.

SUMMARY OF THE INVENTION

There has now been discovered and disclosed herein a novel process for manufacturing high temperature fuel cell components such as electrodes and bubble barriers which combines the advantageous features and process steps of tape casting and pack cementation. By thus combining the two prior art manufacturing processes into a single operation, the cost of obtaining a component with a uniform electrode microstructure has been significantly reduced due to a decrease in the number of heat treating steps and the fact that a lower heat treating temperature can be used and by elimination of the inert filler and paper required in batch pack cementation. The process is also amenable to continuous processing and ensures uniform distribution of the alloying metal in the base metal, even in applications involving only a very low level of alloy.

In this novel component fabrication process, particles of a base metal and a master alloy are dispersed and suspended in a liquid medium along with a binding agent and a metal halide activator. The suspension is formed into the appropriate shape, typically by tape casting. Then, the casting is heated to form a porous, flexible green structure in which the particles of base metal and master alloy and the halide activator are distributed. Finally, the green structure is so heat treated as to: (a) burn out the binder phase of the structure; (b) form an alloy of the alloying metal in the master alloy and the base metal; and (c) sinter together into a coherent, porous, metallic structure the particles of the alloy formed by heat treating the green component structure.

The process is simple and inexpensive and can be employed to make structurally stable, highly efficient fuel cell components.

Furthermore, by varying the type and amount of alloy metal in the master alloy (e.g., the amount of Al by using Ni-1Al, Ni-3Al, etc.), the amount and type of activator salt, and the heat treating temperature, atmosphere and time at temperature, fuel cell components with varying alloy contents optimal for different applications of the invention can be readily manufactured.

From the foregoing, it will be apparent to the reader that one important and primary object of the present invention is the provision of novel, improved methods of fabricating components for high temperature fuel cells.

Other important objects, as well as additional advantages and features of the invention, will be apparent to the reader from the foregoing and the appended claims and as the ensuing detailed description and discussion proceeds in conjunction with the accompanying drawings.

DETAILED DESCRIPTION OF THE INVENTION

Figure 1:
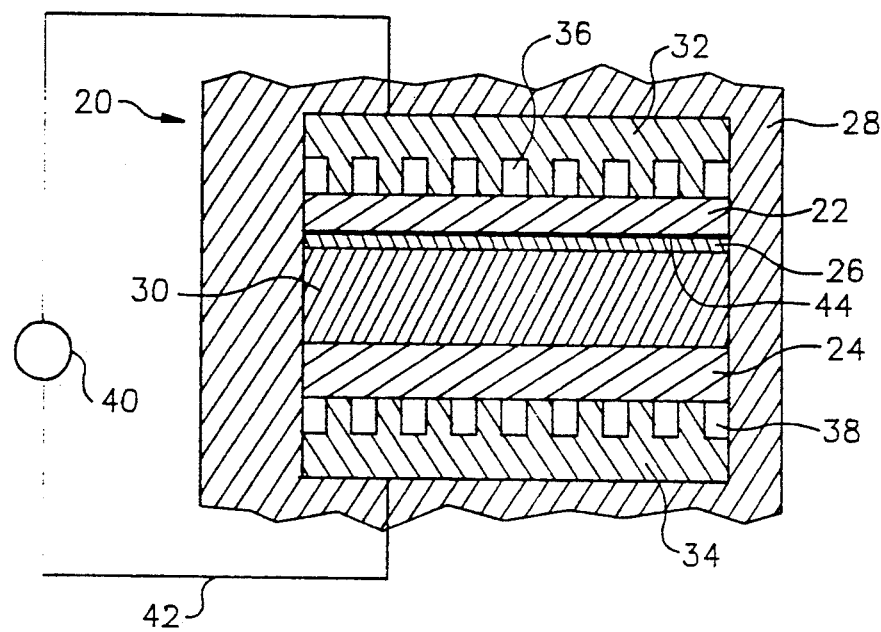
FIG. 1 is a section through a fuel cell with components fabricated by a process embodying the principles of the present invention.

Referring now to the drawing, FIG. 1 depicts a fuel cell 20 having an anode 22, a cathode 24, and an anode-associated bubble barrier 26, all of a sheet or tapelike configuration and all fabricated of a porous metal alloy with a uniform microstructure in accord with the principles of the present invention. The electrodes 22 and 24 are housed in a casing 28 along with an electrode separating tile 30 and current collectors 32 and 34. The electrodes 22 and 24 and bubble barrier 26 may be of a Ni-3Al alloy composition, and tile 30 may be composed of a eutectic carbonate mixture in a $LiAlO_2$ matrix.

An appropriate fuel, typically a humidified $H_2/CO_2$ mixture, is fed to fuel cell anode 22 through passages 36 in current collector 32. Here, the fuel reacts with carbonate ions contained in the electrolyte to generate an excess of electrons in accord with the following typical equation:

$$H_2 + CO_3^= \rightarrow H_2O + CO_2 + 2O^-$$

An oxidant, typically an air/$CO_2$ mixture, is similarly fed to porous metal cathode 24 through passages 38 in the cathode-associated current collector 34.

Electrons flow from the anode through an external load to the fuel cell cathode where the following reaction may occur:

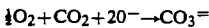

$$\tfrac{1}{2}O_2 + CO_2 + 2O^- \rightarrow CO_3^=$$

The circuit is completed by ionic transport through the electrolyte.

Bubble barrier 26 is mounted or fabricated on the front face 44 of anode 22. This fuel cell component prevents mixing of the fuel supplied to anode 22 with the oxidant supplied to cathode 24.

Figure 2:
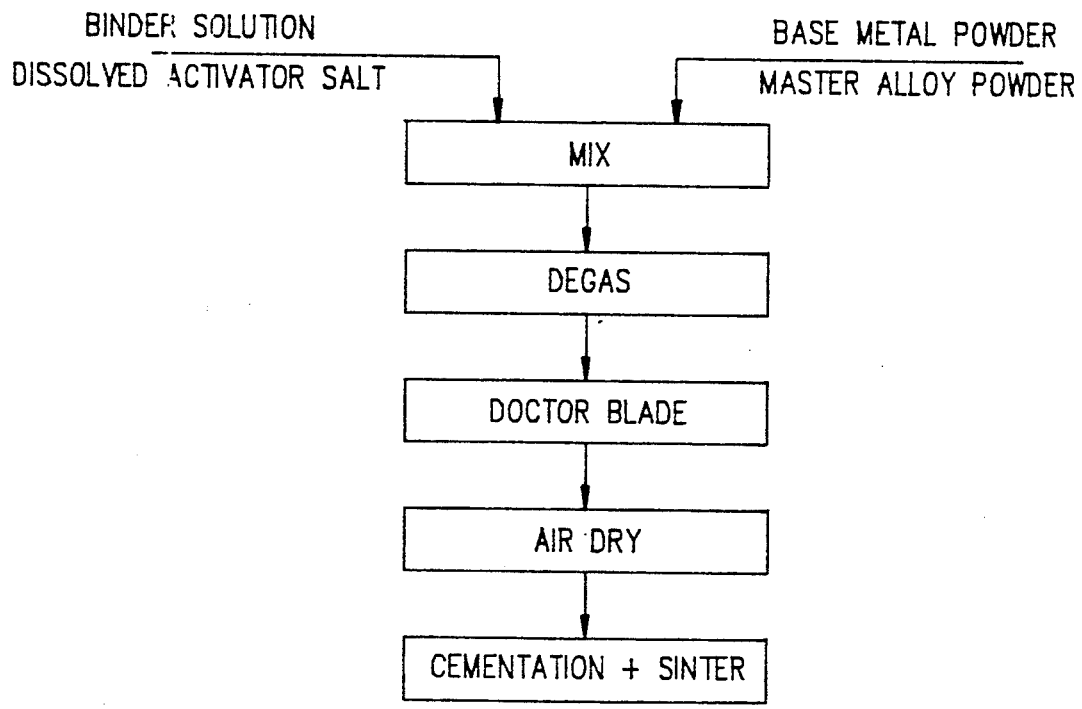
FIG. 2 is a flow diagram of a process for fabricating porous, metal, fuel cell components in accord with the principles of the present invention.

Referring now to FIG. 2, it was pointed out above that the initial step in the fabrication of sheet—or tapelike—fuel cell components such as the anode 22, cathode 24, and bubble barrier 26 depicted in FIG. 1 is the formation of a castable slurry or slip consisting of: a liquid medium or carrier, fine particles of a base metal and of a master alloy suspended in the carrier, an organic binder, and a halide activator dissolved or otherwise uniformly dispersed in the carrier. Conventional adjuvants such as wetting agents and other dispersants, deflocculants, and antifoaming agents may also be incorporated in the slip which can be formulated in a Waring or other high speed blender or in a vibratory mill. The base metal is selected from the group consisting of nickel, iron, cobalt, copper, silver, chromium, platinum, palladium, neodymium, rhodium, ruthenium, gold, cadmium, zinc, and molybdenum. The master alloy comprises an alloying element selected from the group consisting of aluminum, titanium, iron, silicon, beryllium, yttrium, and thorium.

A miscible mixture of organic and aqueous carriers can be used to advantage to dissolve both the organic binder and the halide activator. A mixture of methylene chloride and water in amounts sufficient to completely dissolve the binder and activator is suitable.

Efficient operation of a high temperature fuel cell may dictate that its electrodes (and bubble barriers, if any) be free of the residual carbon commonly left behind upon the thermal decomposition of organic binders. If so, an acrylic binder such as Metoramic Sciences' CB-131, B73180, B73181, B73185, or B73190 binders can be employed. Otherwise, the foregoing and other acrylic binders or others such as the polyvinyl butyl binders disclosed in U.S. Pat. No. 4,111,968 issued 25 Oct. 1983 to Reiser et al. for MOLTEN CARBONATE FUEL CELL INTEGRAL MATRIX TAPE AND BUBBLE BARRIER can be used.

For nickel-based components, the base metal may be supplied to the slip in the form of the 2-3 micron nickel carbonyl particles described above or in other, less expensive forms—e.g., the graded nickel powders described in U.S. Pat. No. 3,471,287 issued 7 Oct. 1969 to Roberts, Jr. for PROCESS FOR MAKING MULTIPOROUS FUEL CELL ELECTRODES. As pointed out in that patent, other base metals suitable for fuel cell components are also "available commercially" in powder form. These include the above-mentioned Fe, Co, Cu, Ag, and Cr.

The master alloy constituent of the castable slip supplies the element which is alloyed with the base metal to provide a fuel cell component with the wanted composition. In those cases where nickel is the base metal, the master alloy may as one example be a Ni-Al alloy; e.g., the -325 mesh Ni-3Al powder supplied by Consolidated Astronautics.

In other applications, other master alloys with such alloying elements as Al, Cr, Ti, and Si and mixtures of those elements may be preferred.

Depending upon such factors as the base metal, the composition of the fuel cell component alloy that is wanted, and the activator which is selected, the ratio of master alloy to base metal in the slip may range from 1:99 to 80:20.

As its name implies, the activator potentiates the alloy forming process. More particularly, as the green structure is heated to form the fuel cell component, the activator and the master alloy react, forming halide vapors of the alloying element—for example, aluminum chloride vapors in those systems employing a Ni-Al master alloy. The metal halide vapors deposit on the surfaces of the base metal particles; and the alloying metal diffuses inwardly, combining with the base metal to form the wanted alloy.

The activators employed in the practice of the present invention are halides of monovalent and polyvalent cations. It is required that the halide be soluble in the binder solution. Representatives of the salts that can be used, preferably a chloride or fluoride, are: NaCl, $NH_4Cl$, $AlCl_3$, $CrCl_2$, $FeCl_2$, and $NH_4F$.

The base and master alloy powders are suspended in the binder solution and the activator dissolved in that solution by vibratory mixing. An impeller mixer or a vibratory mill operated for a period of 20 to 120 minutes can be employed to prepare the suspension.

If bubbly, the slip or suspension is preferably degassed as bubbles have the potential to create voids in the structure into which the slip is cast. These produce unwanted irregularities in the fuel cell component that might lead to structural failure or to inferior performance characteristics. Degassing can be accomplished by placing the suspension under vacuum or by rolling the slurry in a cylindrical container.

The slip is formed into the wanted shape by tape casting. In this step, the slip is cast onto a smooth surface with a moving doctor blade being used to control the thickness of the casting which will typically range from 0.020 to 0.120 in. thick.

Next, the solvent is removed. This leaves a thin, flat but flexible structure (or green tape). The green tapes are highly porous (typically ~80 percent), and the base metal alloy powders and the activator are uniformly distributed throughout the tape.

The solvent can be removed by air drying the casting under a hood. However, in manufacturing castings employing the principles of the present invention in commercial quantities, a tape caster with drying sections is preferably employed to first form the tape and then remove the solvent. Suitable tape casters of this character are commercially available.

The final step in the process of fabricating the fuel cell component is to heat the cast structure or green tape as to: (1) burn out remaining binder constituents, (2) form the wanted alloy by the above-described vapor deposition and diffusion process, and (3) sinter the alloy particles into a porous, stable structure usable as a fuel cell component. This step is preferably carried out in vacuum, in a nitrogen or other inert gas atmosphere, or in a reducing atmosphere to prevent oxidation of the alloy or its constituents and a consequent degradation in the performance of the fuel cell component.

The burnout, alloying, and sintering steps are carried out heating the green structure at atmospheric pressure to a temperature in the range of 800° C. to 1200° C. over a period of 3 to 15 hours; holding the artifact at the temperature to which it is heated for a period of 30 to 120 minutes; and then cooling the artifact to ambient temperature over a period of 2 to 8 hours.

The invention may be embodied in many forms without departing from the spirit or essential characteristics of the invention. The present embodiments are therefore to be considered in all respects as illustrative and not restrictive, the scope of the invention being indicated by the appended claims rather than by the foregoing description. All changes which come within the meaning and range of equivalency of the claims are therefore intended to be embraced therein.

What is claimed is:

1. A method of manufacturing a porous metal alloy component for a high temperature fuel cell, said method comprising the steps of:
   suspending particles of a base metal and a master alloy in a liquid medium which has dispersed therein a binding agent and a halide activator;
   casting the suspension thus formed;
   removing the liquid medium from the cast suspension to form a porous green structure in which the particles of base metal and master alloy and the halide activator are uniformly distributed; and
   so heat treating the green structure as to: (a) burn out the binder phase of the structure, (b) form an alloy of the master alloy and the base metal, and (c) sinter together into a coherent, porous, metallic structure the particles of the alloy formed by heat treating the green component structure, the green structure being heat treated in an environment effective to prevent oxidation of the alloy or its constituents and by heating said structure at atmospheric pressure to a temperature in the range of 800° C. to 1200° C. over a period of 3 to 15 hours, holding the structure at the temperature to which it is heated for a period of 30 to 120 minutes, and then cooling the structure to ambient temperature over a period of 2 to 8 hours.

2. A method as defined in claim 1 in which the base metal is selected from the group consisting of nickel, iron, cobalt, copper, silver, chromium, platinum, palladium, neodymium, rhodium, ruthenium, gold, cadmium, zinc, and molybdenum.

3. A method as defined in claim 2 in which the base metal is nickel.

4. A method as defined in claim 1 in which the master alloy comprises an alloying element selected from the group consisting of aluminum, titanium, iron, silicon, beryllium, yttrium, and thorium.

5. A method as defined in claim 1 in which the base metal is nickel and the master alloy is a nickel-aluminum alloy.

6. A method as defined in claim 1 in which the liquid medium is removed from the cast suspension by heating the casting.

7. A method as defined in claim 1 in which the activator is a metal or ammonium chloride or fluoride.

8. A method as defined in claim 1 in which, in the course of heat treating the dried casting, said casting is heated to a temperature which is effective to: (a) effect a reaction between the activator and master alloy which results in the generation of a halide of the alloying element in vapor form and the depositing of the vapor on the particles of base metal; and (b) the subsequent inward diffusion of the alloying metal into the particles of base metal and the consequent formation of the metal alloy.

9. A method as defined in claim 1 in which the heat treating of the dried casting is carried out in a reducing atmosphere.

10. A method as defined in claim 1 in which the suspension is formed into a wanted shape by tape casting.

* * * * *